United States Patent [19]

Mueller et al.

[11] Patent Number: 5,426,158
[45] Date of Patent: Jun. 20, 1995

[54] CROSSLINKED SILOXANE-URETHANE POLYMER CONTACT LENS

[75] Inventors: Karl F. Mueller, New York; Paul Harisiades, Woodhaven, both of N.Y.

[73] Assignee: Ciba-Geigy Corp., Ardsley, N.Y.

[21] Appl. No.: 227,481

[22] Filed: Apr. 14, 1994

Related U.S. Application Data

[60] Continuation of Ser. No. 112,902, Aug. 26, 1993, abandoned, which is a continuation of Ser. No. 1,913, Jan. 8, 1993, abandoned, which is a continuation of Ser. No. 603,100, Oct. 25, 1990, abandoned, which is a division of Ser. No. 250,200, Sep. 28, 1988, Pat. No. 4,983,702.

[51] Int. Cl.⁶ .................................... C08F 283/04
[52] U.S. Cl. .................... 525/455; 525/479; 525/903; 528/28
[58] Field of Search ............... 525/455, 479, 903; 528/26, 28

[56] References Cited

U.S. PATENT DOCUMENTS

| | | | |
|---|---|---|---|
| 4,136,250 | 1/1979 | Mueller et al. | 528/29 |
| 4,486,577 | 12/1984 | Mueller et al. | 525/474 |
| 4,605,712 | 8/1986 | Mueller et al. | 525/474 |
| 4,632,968 | 12/1986 | Yokota et al. | 526/279 |
| 4,786,657 | 11/1988 | Hammar et al. | 522/90 |
| 4,853,453 | 8/1989 | Schäfer et al. | 528/28 |

*Primary Examiner*—Ralph H. Dean
*Attorney, Agent, or Firm*—Edward McC. Roberts; R. Scott Meece

[57] ABSTRACT

A contact lens is described which is synthesized by reaction in a mold of a isocyanate capped poly(dialkylsiloxane) prepolymer with a poly(dialkylsiloxane) di- or polyalkanol. The clear polyurethane rubber contact lens is readily made completely wettable by a transfer-grafting process or post-treatment and has a high oxygen permeability.

13 Claims, No Drawings

CROSSLINKED SILOXANE-URETHANE POLYMER CONTACT LENS

This application is a continuation of application Ser. No. 08/112,902, filed Aug. 26, 1993, abandoned; which is a continuation of Ser. No. 08/001,913 filed Jan. 8, 1993, abandoned; which is a continuation of Ser. No. 07/603,100 filed Oct. 25, 1990, abandoned; which is a divisional of Ser. No. 250,200 filed Sep. 28, 1988, now U.S. Pat. No. 4,983,702.

BACKGROUND OF THE INVENTION

From the standpoint of comfort, durability and optical performance, an ideal contact lens should be soft, very wettable yet low in bulk water content, clear and have an oxygen permeability greater than 50 [barrers]. In present day soft contact lenses comfort and wettability are achieved by using hydrogels with 30–80% water content, but at the expense of limited oxygen-permeability, physical strength and formation of protein-deposits. High oxygen permeability is achieved in contact lenses made entirely from silicone rubber, as described for instance in U.S. Pat. No. 3,996,187, but at the expense of wettability. In addition, silicone rubber, because of its great inherent hydrophobicity and chain mobility, rapidly and tenaciously interacts with lipids in the tear liquid, resulting in quick dewetting and potential adhesion to the cornea.

It would be highly desirable to produce a contact lens composed entirely of silicone rubber since it offers the highest oxygen permeability of all presently available materials. The enhancement of eye comfort and long wear capability would represent a significant improvement in contact lens development. Silicone rubber lenses, although possessing high oxygen permeability, suffer from poor comfort characteristics because they are not soft enough to conform to the cornea in the same way a typical hydrogel lens does. On the other hand, silicone-free polyurethane rubbers are known for their excellent bio-compatibility, as examplified by the use of BIOMER—a linear polyurethane rubber—to coat artificial hearts to reduce blood clotting.

Silicone rubbers are made by crosslinking liquid polysiloxanes. These rubbers are thermoset polymers which can be made to varying degrees of hardness and elasticity by controlling the degree of crosslinking and the molecular weight of the silicone fluid. Silicone rubber is usually made by vulcanizing polydimethylsiloxane fluids with organic peroxides at elevated temperatures. Another approach to crosslinking employs hydrosilation in which poly(vinylalkyl siloxanes) are cured with poly(hydridoalkylsiloxanes) in the presence of transition metal catalysts. Silicone rubber has also been formed by chemically reacting, $\alpha,\omega$-difunctional poly(-diorganosiloxanes) with polyfunctional silanes and siloxanes. Typically the crosslinking reaction is a condensation which forms a siloxane bond and a volatile byproduct. Common examples of this type of cure reaction are silanol-alkoxylsilane (French Pat. 1,042,019), silanol-acetoxysilane (German Appl. 1,121,803), silanol-silane (Brit. Pat. 804,199), and silanol-silanol (via the corresponding acetone oxime) (Belg. Pat. 614,394). Suitable catalysts for these reactions are amines and carboxylic acid salts of Sn, Pb, Zn, Sb, Fe, Cd, Ba, Ca and Mn.

Organosiloxane isocyanates have been prepared (U.S. Pat. No. 3,179,622) which vulcanize when exposed to moisture. In these cases the isocyanate group is joined to the siloxane through an alkyl group, rendering it unhydrolyzable. Besides moisture cured polyurethanes, silicone rubber, which are 2-component polyurethanes are conveniently prepared by reaction of di-, tri- or tetra hydroxyalkyl-substituted polysiloxanes with di-isocyanates, using the well known techniques of conventional polyurethane synthesis. Most commonly these poly-hydroxyalkyl-polysiloxanes are used as additives to conventional polyurethane formulations, for instance to regulate pore size in polyurethane foams, to impart lubricity or gloss to polyurethane coatings or achieve water repellency.

The silicone rubbers, which are described for use as soft, oxygen permeable contact lenses, are obtained by hydrosilation reaction between poly-(vinyl-alkyl siloxanes) and poly-(hydridoalkyl siloxanes), as described in U.S. Pat. No. 3,996,187. Silicone rubber like materials for use as soft contact lenses which are free-radical polymerized copolymers of methacrylate-functionalized polydimethylsiloxanes have also been described in U.S. Pat. No. 4,605,712.

It has now been found that polysiloxane-polyurethane rubbers also make excellent soft contact lens material, combining clarity, high elongation and softness with exceptional oxygen-permeability.

Such contact lenses, which are entirely based on poly(dialkylsiloxane) di- or tri-alkanols and diisocyanates have not been described before.

All silicone containing contact lens materials, be they conventional silicone rubbers or the polysiloxane-polyurethanes of this invention are extremely hydrophobic and attract lipid deposits when worn in the eye. In order to overcome the hydrophobic nature of silicone rubber, silicone rubber lenses, such as SILSOFT (DOW-CORNING) have to be surface treated to render them wettable. Numerous such surface treatments have been described:

Relevant United States patents in this area include: U.S. Pat. No. 3,925,178 describes surface treatment by water-vapor subjected to an electrical discharge. U.S. Pat. No. 4,099,859 describes grafting a hydrophilic polymer onto a silicone-rubber contact lens by coating the lens with a hydrophilic monomer followed by exposure to UV. U.S. Pat. No. 4,229,273 describes grafting of a acrylic polymer onto a silicone rubber lens pre-irradiated in the presence of oxygen. U.S. Pat. No. 4,168,112 describes the formation of a poly-electrolyte complex on the surface of a contact lens in order to render it more hydrophilic and comfortable to wear. U.S. Pat. No. 4,217,038 describes the formation of a glass-coating on a silicone contact lens to improve wettability. U.S. Pat. No. 4,409,258 describes a hydrophilizing treatment of contact lenses by bombardment with nitrogen and oxygen ions. U.S. Pat. No. 4,388,164 describes coating the surface of a silicone rubber with a thin metal film by vacuum decomposition in the stretched state. U.S. Pat. No. 4,332,922 describes hydrophilization of silicone contact lenses by a gas-discharge. U.S. Pat. No. 4,143,949 describes putting a hydrophilic coating onto a hydrophobic contact lens by radiation induced polymerization. U.S. Pat. Nos. 4,311,573 and 4,589,964 describe hydrophilization of a hydrophobic polymer by ozone treatment, followed by a grafting of vinyl monomers through decomposition of the formed peroxy groups.

Although these methods allow fabrications of wettable silicone rubber lenses, most of them have major drawbacks; for instance polymerizations can occur not only on the surface, but also in the liquid polymerization medium. Also, because the graft-polymerization depends on active centers, which decompose at different times, inhomogeneous surfaces result because of preferential absorption of monomer into already modified surface regions. In cases where exact depth-control and uniformity of the grafted region is important, such as for example in the surface modification of contact lenses, such uncontrollable grafting reactions are not acceptable. On the other hand, if to reduce inhomogeneities grafting is carried out for a short time only, the grafted surface regions are too thin and in many applications the desired effect soon wears off. Exact control over reaction conditions is therefore very important.

It has now also been discovered, that polysiloxane-polyurethane rubbers are especially well suited to make soft contact lenses not only with excellent oxygen permeability, but excellent wettability and hydrogel-like softness as well, when they are prepared in contact lens molds which have previously been coated with a reactive hydrophilic polymer, which is transfer-grafted during cure.

It has been further discovered, that polysiloxane-polyurethane rubbers can be made in form of an interpenetrating polymer network (IPN) with a free-radical polymerized vinyl polymer; these IPN's are often clear and besides being highly oxygen permeable, allow the physical properties of the polysiloxane-polyurethane rubber to be varied over a wide range; they include water swellable compositions and compositions bearing polar groups which are otherwise difficult to incorporate into a polyurethane.

OBJECTS OF THE INVENTION

The object of the invention is to provide an ophthalmic device, preferably a contact lens, made of a crosslinked siloxane-urethane polymer.

Another object of this invention is a crosslinked siloxane-urethane polymer in form of an interpenetrating polymer network with a free radical polymerized vinyl polymer.

DETAILED DESCRIPTION

The instant invention pertains to an ophthalmic device, preferably a contact lens, made of a crosslinked siloxane-urethane polymer which comprises the reaction product of (A) a di- or poly-hydroxyalkyl substituted alkyl polysiloxane having a molecular weight between about 200 and about 10,000, and (B) a substantially compatible, aliphatic, cycloaliphatic or aromatic di- or tri-isocyanate;

wherein the total number of hydroxyl groups in component (A) is substantially stoichiometrically equivalent to the total number of isocyanate groups in component (B), and with the proviso that an effective crosslinking amount of (A) or (B) or both (A) and (B) is present and possesses a functionality greater than two.

Poly-functional polysiloxanes, useful as component (A) are of structures:

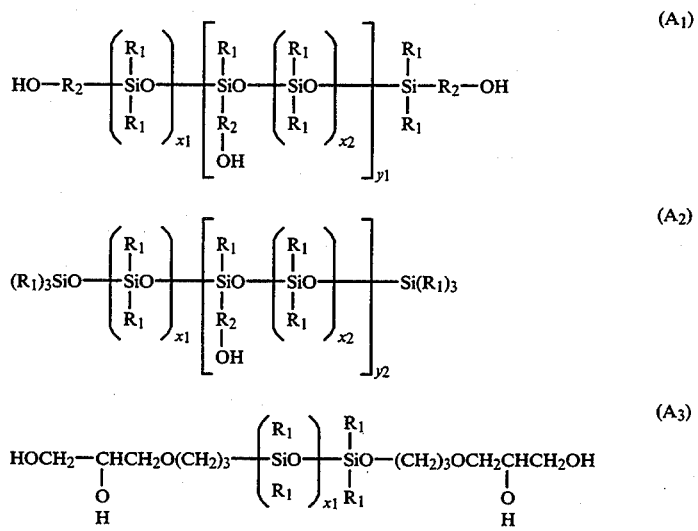

wherein:

$R_1$ is an alkyl group of 1 to 4 carbon atoms or phenyl, $R_2$ is a linear or branched alkylene group with 2 to 6 carbon atoms ($\equiv R_2a$), a polyoxyalkylene group of structure:

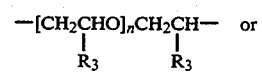

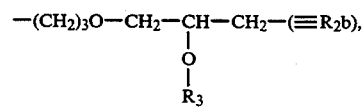

wherein $R_3$ is hydrogen or methyl and n is an integer from 1 to 50;

$x_1$, $x_2$ are integers from 1 to 500; $y_1$ is 0 to 4, $y_2$ is 2 to 5 with the proviso that the ratios of:

$$\frac{x_1 + x_2 y_1}{y_1 + 2} \text{ and } \frac{x_1 + x_2 y_2}{y_2}$$

are not greater than 70.

By "compatible" is meant that component (B) is reactable with component (A) to yield a reaction product which is substantially optically clear.

In a preferred embodiment of the instant invention the di- or triisocyanate (B) or mixture of said isocyanates is reacted with approximately half the equivalent amount of the polysiloxane-polyalkanols of structure $A_1$, $A_2$ or $A_3$ to form an isocyanate capped prepolymer, which is subsequently reacted with the remaining half equivalents of polysiloxane-polyalkanol to form the crosslinked polysiloxane-polyurethane. Some preferred compositions consist of polyurethanes where (A) is of structure $A_1$, where
$y_1$ is zero to 1, $x_1$ is 5–50
$R_1$ is methyl,
$R_2$ is propylene, butylene, 1-methyl propylene ($\equiv R_{2a}$) or

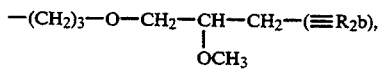

and
the diisocyanate (B) is isophorone diisocyanate (IPDI) or 2,2,4 (2,4,4)-trimethylhexane-1,6-diisocyanate (TMDI).

Other preferred compositions consist of polyurethanes where (A) contains 40–60 equivalent percent of polysiloxane-tetrols of structure $A_3$, and diisocyanate (B) is IPDI or TMDI.

Most preferred are compositions where
(A) contains 40–60 equivalent percent of polysiloxane diols of structure $A_1$, where
$y_1$ is zero or 1,
$x_1$ is 1–5,
$R_1$ is methyl,
$R_2$ is propylene or butylene, and the diisocyanate (B) is IPDI or TMDI.

Other most preferred composition are where (A) contains 40–60 equivalent percent of polysiloxane tetrols $A_3$, where
$x_1$ is 10–50 and
$R_1$ is methyl, and
40–60 equivalent percent $A_1$, where
$y_1$ is zero,
$x_1$ is 15–60,
$R_1$ is methyl,
$R_2$ is propylene or 1-methylpropylene,
or

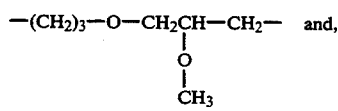

(B) is isophorone diisocyanate or 2,2,4(2,4,4)-trimethylhexane-1,6-diisocyanate.

Diisocyanates or triisocyanates (B) useful to form the prepolymer intermediate are aliphatic, cycloaliphatic or aromatic polyisocyanates. Component (B) is a diisocyanate, triisocyanate or mixture thereof selected from the group consisting of ethylene diisocyanate, 1,2-diisocyanatopropane, 1,3-diisocyanato-propane, 1,6-diisocyanatohexane, 1,2-diisocyanatocyclohexane, 1,3-diiso-cyanatocyclohexane, 1,4-diisocyanatobenzene; bis(4-isocyanatocyclohexyl)methane, bis-(4-isocyanatecyclohexenyl)methane, bis(4-isocyanatophenyl)methane, 1,2- and 1,4-toluene diisocyanate; 3,3-dichloro-4,4'-diisocyanatobiphenyl; tris(4-isocyanatophenyl)methane, 1,5-diisocyanato-naphthalene, hydrogenated toluene diisocyanate; 1-isocyanatomethyl-5-isocyanato-1,3-3-trimethylcyclohexane (=isophorone diisocyanate); 1,3,5-tris(6-isocyanatohexyl) biuret, 1,6-diisocyanato-2,2-4-(2,4,4)-trimethyl-hexane, 2,2'-diisocyanatodiethyl fumarate; 1,5-diisocyanato-1-carboxypentane; 1,2-, 1,3-, 1,6-, 1,7-, 1.8-, 2,7- and 2,3-diisocyanatonaphthalene; 2,4- and 2,7-diisocyanato-1-methylnaphthalene; 1,4-diisocyanato-methylcyclo-hexane; 1,3-diisocyanato-6(7)-methylnaphthalene; 4,4'-diisocyanatobiphenyl; 4,4'-diisocyanato-3,3'-dimethoxy-bisphenyl; 3,3'- and 4,4'-diisocyanato-2,2'-dimethyl biphenyl; bis-(4-isocyanatophenyl) ethane; bis(4-isocyanatophenyl ether.

The most preferred diisocyanates are isophorone diisocyanate, 2,2,4-(2,4,4)-trimethylhexane-1,6-diisocyanate or 1,2- or 1,4-toluene diisocyanate.

The compatible, interpenetrating-polymer-network compositions of the instant invention comprise (I) 95–50%, preferably 95–75%, by weight of the total composition of the reaction product of (A) of di- or poly-hydroxyalkyl substituted alkyl polysiloxane having a molecular weight between about 200 and about 10,000, and (B) a substantially compatible, aliphatic, cycloaliphatic or aromatic di- or tri-isocyanate, wherein the total number of hydroxyl groups in component (A) is substantially stoichiometrically equivalent to the total number of isocyanate groups in component (B), and with the proviso that an effective crosslinking amount of (A) or (B) or both (A) and (B) is present and possesses a functionality greater than two, and (II) 5–50%, preferably 5–25%, by weight of the total composition of a vinyl polymer or copolymer obtained by the free-radical polymerization of a vinyl monomer or mixture of vinyl monomers.

Compatible in this context means that the interpenetrating network of polymers when converted into contact lenses are optically clear and not hazy.

The crosslinked polysiloxane-polyurethane of component (I) is prepared from components (A) and (B) which are described earlier in this application in detail.

The vinyl polymers of component (II) are prepared by the free-radical polymerization of the esters, including the $C_1$–$C_{22}$-linear or branched alkyl or hydroxyalkyl esters, or amides of acrylic, methacrylic or maleic acids, vinyl esters, vinyl ethers, styrene or N-vinylpyrrolidone.

Preferably component (II) is prepared from a fluoroalkyl acrylate or methacrylate with 3 to 21 F atoms in the fluoroalkyl group, such as heptafluorobutyl-, hexafluoroisopropyl- or $R_f$-ethyl acrylate or methacrylate where $R_f$ is perfluoroalkyl of 6 to 10 carbon atoms, from an oligosiloxanylsilyl-alkyl acrylate or methacrylate with 2 to 10 Si atoms the oligosiloxanyl group, from a hydroxyalkyl acrylate or methacrylate, N-vinylpyrrolidone, N,N-dimethylacrylamide or methyl methacrylate.

Most preferred vinyl monomers for component (II) are N,N-dimethylacrylamide, methyl methacrylate, 2-hydroxyethyl methacrylate, methacryloxypropyl-tris(trimethylsiloxy)silane and tridecylfluorohexyl-ethyl methacrylate.

The instant compatible interpenetrating-polymer-network compositions are useful for making ophthalmic devices, preferably contact lenses.

Synthesis

Synthesis of the novel polysiloxane-polyurethanes follows the general procedures of polyurethane chemistry. Preferably, a prepolymer is prepared in a first step by reaction of approximately half the equivalent amount of polysiloxane-polyalkanol with the full equivalent amount of a diisocyanate; this prepolymer, which contains terminal isocyanate groups, is then in a final reaction step connected into the crosslinked polysiloxanepolyurethane rubber by mixing it with the remaining half of the polysiloxane-polyalkanol, filling it into a mold an curing it at elevated temperatures.

Both reaction steps are preferably catalyzed by any of the catalysts commonly used in polyurethane chemistry, especially tin compounds like dibutyltin dilaurate (DBTL) a stannous octoate, or by tertiary amines, like triethylamine; the catalysts can be present in amounts of zero to 0.2%⁻ (by weight). The reaction temperature can vary from 20°–100° C. and is preferably between 40°–60° C.

If polysiloxane-dialkanols are used, it is possible to carry out the first reaction step with an OH:NCO equivalent (or mol) ratio from 1:2 to 6:8 and thereby make prepolymer which contain from one to an average of 3 polysiloxane chains within their structure; if polysiloxane-tri (or tetra) alkanols are used for step 1, the molar ratios of polysiloxane-alkanol to diisocyanate can range from 1:3 (1:4) to 2:5 (2:7), thereby encompassing prepolymers with one or up to an average of two polysiloxane chains within their structure. Such chain extended prepolymers are thus within the scope of this invention.

It is of course possible to use mixtures of polysiloxane-alkanols of structures $A_1$, $A_2$ or $A_3$ to make the prepolymers and the final polyurethane, as long as the basic rules of polyurethane synthesis familiar to those skilled in the art, are observed.

Instead of preparing the poly-isocyanato polysiloxane prepolymers from (B) and polysiloxanes $A_1$, $A_2$, or $A_3$, any of the above mentioned diisocyanates can be used by themselves, with isophorone diisocyanate and 1,6-diisocyanato-2,4,4-(2,2,4)trimethylhexane being the preferred isocyanates. It is also within the scope of this invention, to use minor amounts of polymeric diisocyanates of 500–5000 MW based on polyalkylene-ether- or polyester-diol reacted with the diisocyanates listed above in combination with the isocyanato-functional polysiloxanes, as long as clear and compatible mixtures are obtained.

Compatibility can often be improved by the use of compatibilizing aprotic solvents, such as N,N-dimethylformamide, N-methylpyrrolidone, dimethyl sulfoxide, isopropyl acetate, methyl ethyl ketone and the like. Solvents also facilitates removal from the mold and improve the quality of the molded lens, especially of the edges. Such solvents can be present in amounts from zero to 50% (by weight). The preparation of the poly-(siloxane-urethane) in the presence of an aprotic solvent is thus within the scope of the invention.

It is within the scope of this invention to have other reactive components present, as long as they remain compatible with the siloxane-urethane polymer and do not result in hazy or opaque lenses. Useful additional components are, for example, polyethylene oxide diols with 2–1000 repeating ether units to impart hydrophilicity to the bulk, or perfluorinated polyether diols to impart oleophobicity and resistance to protein and lipid absorption; ethylene glycol, glycerol, propylene glycol, butanediol, thio-diethylene glycol, and cationic groups containing diols such as N-methyldiethanol or N,N-bishydroxyethylpiperazine and the like. These and other components can be either incorporated during the final cure, or by the known techniques of chain extension before the final crosslinking cure is carried out. In this manner unsaturated groups can also be incorporated, using for instance butenediol or butynediol, or maleic anhydride.

Yet another extension of this invention is the synthesis of poly( siloxane-urethanes) as part of an interpenetrating-polymer-network (IPN) containing a vinyl polymer as the second component. Such polymers can be obtained by using vinyl monomers as reactive diluents and polymerizing these vinyl monomers either simultaneously with the polyurethane forming components or subsequently, using either heat, but preferably UV-activated free-radical polymerization.

The contact lenses of this invention are prepared by casting in a suitable mold the polysiloxane-polyurethane prepolymer mixture consisting of approximately equivalent amounts of prepolymer (A) with prepolymer (B) or other diisocyanate according to the known methods of polyurethane synthesis. The reaction mixture can be prepared by stirring A and B under a dry nitrogen blanket while simultaneously mixing in a catalyst, such as dibutyltin dilaurate (DBTL) or other catalysts used in polyurethane manufacture, including catalysts containing tert-amino groups. The amount of catalyst can range from zero to 0.2% (by weight) and is preferably 0.01–0.03% (by weight) DBTL.

The molds can consist of glass, metal or plastic, such as polycarbonate or polypropylene. Preferably these molds are coated with a coreactive hydrophilic polymer like polyvinyl alcohol (PVA), ethoxylated PVA or hydroxyethyl cellulose to give a permanent hydrophilic coating on the lens, according to the invention described in copending U.S. patent application 250,199, filed Sep. 28, 1988, which is now U.S. Pat. No. 5,010,155.

The cure is carried out at temperatures between 25° and 100° C. for 1–10 hours after which the mold is taken apart and the lens removed.

In the following examples Shore-A hardness is determined on 1 cm thick cast buttons Oxygen permeability is determined with $O_2$-Permeometer-Model 201-T (Createch) and using buffered saline (pH=7) as electrolyte and is expressed in units $$O_2 \cdot DK \text{ (barrers)} = \frac{cm^3 \text{ (STP) } cm \cdot 10^{-10}}{cm^2 \cdot sec \cdot cmHg}.$$

Physical-mechanical measurements are carried out with an INSTRON testing apparatus, model 1123 on 0.5–1 mm thick sheets.

In the following examples wettability is determined by measuring air in water contact angles by the captive bubble method (=receding angle), and water in air angles (=advancing angle) on 1 mm thick sheets after three days equilibration in distilled water.

EXAMPLE 1

Synthesis of Diisocyanate Prepolymer B (MW 4700)

Dihydroxyalkylpolydimethylsiloxane (structure $A_1$ with $y_1=0$, $R_2=R_2b$) (MW 4200, Mercor Inc.) (158.04 g, 37.59 m mole) is weighed into a three neck, 300 ml round bottom flask equipped with a mechanical stirrer, thermometer, and nitrogen inlet. Isophorone diisocyanate (16.71 g, 75.19 m mole, 3.0 equivalents) is then added and the two liquids are rapidly stirred to a colorless solution. Dibutyltin dilaurate, DBTL (41 mg, 0.02%) is added and stirring is continued at room temperature. An exothermic reaction soon begins after the catalyst addition and peaks 55 minutes later at 33.5° C. Stirring is continued for another sixty minutes after which time the NCO level falls to ½ of the initial value. The prepolymer is stored at 10° C. in glass bottles under nitrogen. It has a MW (molecular weight) of 4700, by NCO-titration.

EXAMPLE 2

Synthesis of Diisocyanate Prepolymer B (MW 2550)

Dihydroxyalkyl-polydimethylsiloxane (structure $A_1$ with $y_1=0$, $R_2=R_2b$) (MW 2100, Mercor Inc.) (176.58 g, 82.207 m mole) is reacted with two equivalents of isophorone diisocyanate, (IPDI), (36.57 g, 0.1644 mole) in a 300 ml, 3 neck, round bottom flask in the manner described in Example 1 using 71 mg (0.0%) of DBTL catalyst. The prepolymer formed has a molecular weight of 2550 by NCO titration and is stored in a glass bottle at 10° C. under nitrogen.

EXAMPLE 3

Synthesis of Diisocyanate Prepolymer B (MW 1400)

Dihydroxyalkyl-polydimethylsiloxane (structure $A_1$ with $y_1=0$, $R_2=R_2b$) (MW 1000, Mercor Inc.) (116.84 g, 0.1117 mole) is reacted with two equivalents of isophorone diisocyanate, IPDI, (51.90 g, 0.2330 mole) in a 300 ml, 3 neck, round bottom flask with 90 mg (0.08%) DBTL catalyst in the manner described in Example 1. The prepolymer formed has a molecular weight of 1400 by NCO titration and is stored in a glass bottle at 10° C. under nitrogen.

EXAMPLE 4

Synthesis of Tri-isocyanate Prepolymer B from Tri-hydroxyalkyl (polydimethyl-siloxane)

The polydimethylsiloxane trialkanol (structure $A_1$ with $y_1=1$, $R_2=R_2a$)(MW 5750, Shin Etsu 504B) (506.8 g, 88.0 m moles) is mechanically stirred in a one liter, three neck round bottom flask with three equivalents of isophorone diisocyanate, IPDI (58.76 g, 0.2639 mole) for six hours under a nitrogen atmosphere. A mild exotherm (28.5° C.) is noted during the first hour of reaction. The product is a colorless oil with a molecular weight of 6400 as determined by NCO titration and a specific viscosity (2% w/w in isopropanol) of 0.0916. The prepolymer is stored at 10° C. under nitrogen in a glass bottle.

EXAMPLES 5–11

Synthesis of Prepolymer B

Using the same procedure described in Example 1, the other NCO-capped PDMS-prepolymers (B) are synthesized and are summarized on the following table, together with Examples 1–4:

| Ex. No. | Prepolymer B, Structure | MW | Diisocyanate* | NCO Functionality |
|---|---|---|---|---|
| 1 | $A_1$; $y_1 = 0$; $R_2b$ | 4700 | IPDI | 2 |
| 2 | " | 2550 | " | 2 |
| 3 | " | 1400 | " | 2 |
| 4 | $A_1$; $y_1 = 1$; $R_2a$ | 6400 | IPDI | 3 |
| 5 | " | 4060 | " | 3 |
| 6 | " | 6060 | " | 3 |
| 7 | " | 7250 | " | 3 |
| 8 | " | 7800 | " | 3 |
| 9 | $A_1$; $y_1 = 0$; $R_2a$ | 1900 | " | 2 |
| 10 | " | 2850 | " | 2 |
| 11 | $A_1$; $y_1 = 1$; $R_2a$ | 7200 | " | 3 |

*IPDI is isophorone diisocyanate

EXAMPLE 12

Preparation of Silicone Rubber from a Polydimethylsiloxane Tri-isocyanate Prepolymer (B) and 1,3-Bis(4-hydroxybutyl)tetramethyldisiloxane (A)

The tri-isocyanate prepolymer-B of Example 4 (MW 6400) synthesized from the PDMS-trialkanol (Shin Etsu 504B) (22.96 g, 3.588 m mole) is mixed with an equivalent amount of 1,3-bis(4-hydroxybutyl)tetramethyldisiloxane (Petrarch, Inc.) (1.50 g, 5.381 m mole) by mixing at 15 torr in a 50 ml round bottom flask on a rotovaporator for 60 minutes. The formulation is used to fill 5 inch (12.7 cm) square by 1.00 mm thick and 5 inch (12.7 cm) square by 0.5 mm thick molds, the Mylar surface of which has been previously coated with a 1.0μ thick film of hydroxyethyl cellulose (QP100 M, MW 1,000,000, Union Carbide) from a 0.8% aqueous solution. Also filled with the silicone formulation are two 10 mm×15 mm polypropylene button molds. Curing is performed in an 80° C. oven for six hours under a nitrogen atmosphere giving clear, rubbery silicone. The 1.00 m thick sheets are used for measuring tensile strength, modulus, and elongation to break while the 0.50 mm thick sheets are used for measurement of oxygen permeability on a Permeometer. The buttons are used to measure the Shore A hardness of the rubber and its percent swelling and percent extractibles in absolute ethanol.

EXAMPLE 13

Preparation of Silicone Rubber from Poly(dimethylsiloxane)isocyanate Prepolymer (B) and Tetrahydroxyalkyl-poly(dimethylsiloxane) (A)

The isocyanate-capped prepolymer B (MW 4700) of Example 1 (24.66 g, 5.222 m mole) is mixed with an equivalent amount of tetrahydroxyalkyl-poly(dimethyldisiloxane) (structure $A_2$, MW 1200; Mercor Inc.) (3.20 g, 2.612 m moles) in a 50 ml round bottom flask at 15 torr. After 30 minutes a clear, degassed formulation is obtained which is used to fill 5 inch (12.7 cm) square by 1.00 mm thick and 5 inch (12.7 cm) square by 0.5 mm thick molds, the Mylar surface of which has been previously coated with a thin (<1 micron) film of ethoxylated poly(vinyl alcohol) (Polysciences) from a 5% aqueous solution. Two poly(propylene) button molds (15 mm×10 mm) are also filled. Curing is performed in an 80° C. oven under a nitrogen atmosphere for two hours and yields a clear, rubbery silicone. The 1.00 mm thick sheets are used to measure tensile strength, modulus, and elongation to break while the 0.5 mm sheets are used for oxygen permeability measurements on a Permeometer. Values for Shore A hardness, percent swelling and percent extractibles in absolute ethanol are made with 10 mm×15 mm buttons.

EXAMPLES 14–27

Synthesis of polysiloxane-polyurethanes

Using the procedure described in Example 13 polysiloxane-polyurethanes are prepared whose compositions are listed below together with that of Example 13.

| | Tetrafunctional (OH) Prepolymer-A | | | | Difunctional (NCO) Prepolymer-B | | |
|---|---|---|---|---|---|---|---|
| | Structure | MW | g | mmol | of Ex. | g | mmole |
| 13 | A₃ | 1226 | 3.20 | 2.62 | 1 | 24.66 | 5.22 |
| 14 | " | 3404 | 7.56 | 2.22 | 1 | 20.9 | 4.45 |
| 15 | " | 6287 | 8.42 | 1.34 | 1 | 12.6 | 2.67 |
| 16 | " | 1226 | 4.23 | 3.46 | 2 | 17.6 | 6.49 |
| 17 | " | 3404 | 11.00 | 3.24 | 2 | 16.5 | 6.49 |
| 18 | " | 6287 | 9.20 | 1.46 | 2 | 13.82 | 2.93 |
| 19 | " | 1200 | 9.29 | 7.58 | 3 | 12.21 | 15.15 |
| 20 | " | 3404 | 23.90 | 7.04 | 3 | 19.70 | 14.08 |
| 21 | " | 6287 | 11.19 | 1.77 | 3 | 9.01 | 3.53 |
| 22 | " | 1226 | 3.96 | 2.23 | 9 | 13.18 | 6.46 |
| 23 | " | 3404 | 8.52 | 2.11 | 9 | 8.05 | 3.0 |
| 24 | " | 6287 | 9.94 | 1.58 | 9 | 6.01 | 3.16 |
| 25 | " | 1226 | 2.38 | 1.94 | 10 | 11.16 | 3.88 |
| 26 | " | 3404 | 7.12 | 1.77 | 10 | 10.18 | 3.54 |
| 27 | " | 6287 | 8.22 | 1.31 | 10 | 7.53 | 2.62 |

All polymers are clear, colorless and extremely wettable.

EXAMPLES 28–33

Using the procedure of Example 12 polysiloxane-polyurethanes are prepared with the compositions listed below.

| | Component A: (Bis-4-hydroxybutyl) disiloxane | | + Prepolymer B (trifunctional) | | |
|---|---|---|---|---|---|
| Ex. | g | mmole | of Ex. | g | mmole |
| 28 | 1.50 | 5.38 | 4 | 22.96 | 3.59 |
| 29 | 1.76 | 6.32 | 5 | 17.10 | 4.21 |
| 30 | 1.92 | 6.88 | 6 | 27.80 | 4.59 |
| 31 | 0.66 | 2.38 | 7 | 11.72 | 1.59 |
| 32 | 1.63 | 5.86 | 8 | 30.49 | 3.91 |
| 33 | 0.83 | 2.98 | 11 | 14.2 | 1.98 |

All polymers are clear, colorless and extremely wettable.

EXAMPLE 34

The polymers synthesized in Examples 13–33 are tested for their physical-mechanical properties and oxygen permeability.

| Polymer of Ex. | Shore-A | Tensile Strength Dynes/cm² × 10⁵ | Young's Modulus Dynes/cm² × 10⁵ | Elongation to Break (%) | O₂.DK (0.25 mm, 25°) (Barrers) |
|---|---|---|---|---|---|
| 13 | 38 | 66.59 | 223.89 | 37 | 169 |
| 14 | 35 | 9.61 | 101.40 | 17.8 | 177 |
| 15 | 31 | 10.00 | 72.57 | 22 | 183 |
| 16 | 51 | 26.97 | 99.34 | 47 | 200 |
| 17 | 44 | 19.12 | 89.04 | 41 | 209 |
| 18 | 37 | 20.99 | 50.60 | 159 | 202 |
| 19 | 62 | 37.07 | 248.70 | 22 | 93 |
| 20 | 51 | 14.22 | 115.33 | 19 | 180 |
| 22 | 54 | 176.81 | 99.93 | 105 | 125 |
| 23 | 45 | 127.19 | 49.23 | 63 | 135 |
| 24 | 40 | 87.77 | 39.81 | 68 | 155 |
| 25 | 41 | 64.72 | 91.34 | 159 | 136 |
| 26 | 38 | 103.66 | 54.43 | 120 | 259 |
| 27 | 36 | 54.03 | 27.65 | 86 | — |
| 28 | 31 | 14.22 | 40.50 | 60 | 208 |
| 29 | 41 | 35.19 | 80.85 | 75 | 115 |
| 30 | 36 | 38.67 | 61.15 | 134 | 227 |
| 31 | 38 | 36.87 | 69.04 | 133 | 250 |
| 32 | 30 | 26.09 | 45.80 | 109 | 214 |
| 33 | 32 | 17.85 | 46.19 | 59 | 210 |

*Values in parenthesis are after aging at 100° C. for 24 hours.

EXAMPLE 35

Preparation of Silicone Rubber from Tetrahydroxyalkyl-poly(dimethylsiloxane) and 2,2,4-Trimethylhexane-1,6-diisocyanate Tetrahydroxyalkyl-poly(dimethylsiloxane) is a structure $A_3$ (MW 1220, Mercor, Inc.) (15.16 g, 12.426 m mole) is formulated with an equivalent amount of 2,2,4-trimethylhexane-1,6-diisocyanate, TMDI (5.19 g, 24.714 m mole), and 9.1 mg (0.06%) DBTL in the manner described in Example 6. The formulation is cured into sheets and buttons as previously described yielding a clear, hard silicone rubber.

EXAMPLE 36

The tetrahydroxyalkylpoly(dimethylsiloxane) (of structure $A_3$ MW 6300, Mercor, Inc.) (16.98 g, 2.695 m mole) is formulated with an equivalent amount of TMDI (1.12 g, 5.381 m mole) and 2.5 mg (0.015%) DBTL in the manner described in Example 6. The formulation is cured into sheets and buttons are previously described yielding a clear silicone rubber.

EXAMPLE 37

Trihydroxyalkyl-poly(dimethylsiloxane) (of structure $A_1$ with $y_1=1$ and $R_2=R_{2a}$) (19.4 g, 5.07 m mole) is formulated with an equivalent amount of TMDI (1.69 g, 7.6 m mole) and 52 mg DBTL in the manner described in Example 6. The formulation is cured into sheets and buttons are previously described yielding a clear, resilient silicone rubber which has a Shore-A hardness of 32 and a $O_2$.DK (barrers) of 187.

The following two examples describe the formation of contact lenses.

EXAMPLE 38

The poly(dimethylsiloxane)tri-isocyanate prepolymer described in Example 4 (M 6400, 9.86 g, 1.541 m moles) is formulated with an equivalent amount of 1,3-bis(4-hydroxybutyl)tetramethyldisiloxane (M 278.6, 0.644 g, 2.312 m mole). The composition is stirred in vacuo (15 tort) until a degassed, homogeneous mixture is attained (30–45 minutes). Two drops of this formulation are placed in a polypropylene contact lens mold that has previously been dip coated with ethoxylated polyvinyl alcohol (EPVA Polysciences) from a 2% aqueous solution containing 0.01% LODYNE S-100 (CIBA-GEIGY) fluorinated surfactant and dried in a forced-air oven at 80° C. The molds are closed and clamped in a spring loaded holder and cured at 80° C. for two hours. After cooling and removing from the mold, the lenses are stirred in 6° C. water overnight to dissolve ungrafted EPVA. Clean, highly wettable lenses are attained which retained these properties after stirring in boiling water for 7 days.

EXAMPLE 39

The poly(dimethylsiloxane)diisocyanate prepolymer described in Example 1 (M 4700, 6.17 g, 1.3086 m mole) is formulated with an equivalent amount of poly(dimethylsiloxane)tetra-alkanol (structure $A_3$; MW 1220, 0.801 g, 0.6533 m mole). The composition is stirred in vacuo (15 torr) for 30 minutes yielding a clear, homogeneous mixture. Two drops of this formulation are placed in a polypropylene contact lens mold that has previously been dip coated with hydroxyethyl cellulose (HEC) (MW 815,000, Union Carbide) from a 1% aqueous solution containing 0.01% LODYNE S-100 (CIBA-GEIGY) fluorinated surfactant. After curing for 90 minutes at 80° C. the molds are cooled to room temperature and opened. The lenses formed are washed in 60° C. water overnight to remove ungrafted HEC. Even after boiling in water for 7 days, the lenses remain highly wettable and clear.

EXAMPLE 40 a) Synthesis of Diisocyanate Prepolymer with TMDI

Dihydroxypolydimethylsiloxane of structure $A_2$ with $y_1=0$, $R_2=R_2b$ (MW 2760, Shin-Etsu A-1000) (75.63 g, 27.40 m mole) is reacted with two equivalents of 2,2,4-trimethyl-1,6-diisocyanatohexane (TMDI; 11.51 g, 54.80 m mole) in the presence of dibutyltin dilaurate (DBTL) (15 mg, 0.02%) for 3 hours in the manner previously described after which time the NCO level falls to ½ the initial value. The prepolymer is stored under nitrogen in glass bottles at 10° C., the MW is 3300 by NCO titration.

b) Synthesis of polysiloxane-polyurethane rubber

This prepolymer (12.11 g, 3.67 m mole) is formulated with an equivalent amount of PDMS-tetra-alkanol (Structure $A_3$, MW 1226, Mercor, Inc.) (2.25 g, 1.835 g) in the manner previously described, poured into molds and cured at 80° C. (2 hours) giving a clear, resilient rubber with the following properties:

| | |
|---|---|
| Shore A hardness: | 34 |
| Tensile Strength | 34.3 dynes/cm$^2$ × 10$^{-5}$ |
| Young's Modulus: | 100.0 dynes/cm$^2$ × 10$^{-5}$ |
| Elongation to Break: | 61% |

The following three examples describe the synthesis of polysiloxanepolyurethanes with chain-extended polydimethylsiloxane-urethanes.

EXAMPLE 41 a) Synthesis of Chain-Extended (MW 3385) Diisocyanate Prepolymer

Dihydroxyalkyl-polydimethylsiloxane of structure $A_1$ with $>y_1=0$, $R_2=R_2b$ (MW 1500, Shin-Etsu; 146.33 g 97.55 m mole) is weighed into a three neck, 300 ml round bottom flask equipped with mechanical stirrer, thermometer, and nitrogen inlet. Isophorone diisocyanate (32.53 g, 146.3 m mole, 1.5 equivalents) is added and the two liquids are rapidly stirred, forming a white emulsion. Dibutyltin dilaurate, DBTL (29 mg 0.02%) is added and stirring is continued at room temperature. Solubilization occurs within 30 minutes and a mild exotherm (32° C.) is noted approximately 100 minutes after catalyst addition. Stirring is continued for another three hours after which time the NCO level has fallen to ⅓ the initial value. The polymer is stored under nitrogen in glass bottles at 10° C.; the MW is 3385, by NCO titration.

b) Synthesis of Polysiloxane-Polyurethane Rubber

The prepolymer from Example 41a (12.56 g, 3.710 m mole) is formulated with an equivalent amount of PDMS-tetra-alkanol (Structure $A_3$, MW 1226, Mercor, Inc.) (2.27 g, 1.835 g) on a rotavaporator at 20 torr for 30 minutes and then poured into molds in the manner previously described. The composition is cured at 80° C. for 2 hours yielding a clear, colorless, resilient rubber with the following properties:

| | |
|---|---|
| Shore A hardness: | 44 |
| Tensile Strength | 54.9 dynes/cm$^2$ × 10$^{-5}$ |
| Young's Modulus: | 126.6 dynes/cm$^2$ × 10$^{-5}$ |
| Elongation to Break: | 104% |

EXAMPLE 42

The prepolymer from Example 41a (15.20 g, 4.49 m mole) is formulated with an equivalent amount of PDMS-tetra-alkanol (MW 6287, Mercor, Inc.) (14.12 g, 2.245 m mole) in the manner previously described. Curing at 80° C. for 2 hours gives a clear, colorless, resilient rubber with the following properties:

| | |
|---|---|
| Shore A hardness: | 27 |
| Tensile Strength | 12.6 dynes/cm$^2$ × 10$^{-5}$ |
| Young's Modulus: | 36.2 dynes/cm$^2$ × 10$^{-5}$ |
| Elongation to Break: | 80 |

EXAMPLE 43 a) Synthesis of Chain-Extended (MW 2634) Diisocyanate Macromer

Dihydroxyalkyl-polydimethylsiloxane of structure $A_1$ with $y_1=0$, $R_2=R_2b$ (MW 1044, Mercor, Inc.) (82.67 g 79.19 m mole) is reacted with 1.5 equivalents of isophorone diisocyanate, IPDI; 26.41 g, 118.8 m mole) in the manner described in Example 40. After stirring 3½ hours at room temperature, the NCO level falls to ⅓ the initial value. The polymer is stored under nitrogen in glass bottles at 19° C.; the MW is 2634, by NCO titration.

b) Synthesis of Polysiloxane-Polyurethane Rubber

The prepolymer from Example 43 (16.04 g, 6.09 m mole) is formulated with an equivalent amount of PDMS-tetra-alkanol (Structure $A_3$, MW 1226, Mercor, Inc.) (3.73 g, 3.045 m mole) in the manner previously described. Molds are cured at 80° C. for 2 hours yielding clear, resilient rubber with the following properties:

| | |
|---|---|
| Shore A hardness: | 49 |
| Tensile Strength | 91.0 dynes/cm$^2$ × 10$^{-5}$ |
| Young's Modulus: | 123.4 dynes/cm$^2$ × 10$^{-5}$ |

| Elongation to Break: | 168% |
|---|---|

EXAMPLE 44

Preparation of a poly-(siloxane-urethane) with 2,4-toluene diisocyanate.

A: Macromer Synthesis:

2,4-toluene diisocyanate (6.77 g, 0.0389 mole) is charged into a 100 ml round bottom flask equipped with mechanical stirrer, nitrogen inlet, and dropping funnel with pressure equalizer. Polysiloxane trialkanol, (Shinetsu X-61-504B, MW 5370, 69.29 g, 0.130 mole) is sparged with dry nitrogen and then dibutyltin dilaurate (DBTL) 7 mg, is dissolved in the siloxane. The latter is then added to the diisocyanate in a slow stream with vigorous stirring. After two hours the NCO level was dropped to the theoretical value and the clear, colorless prepolymer is poured into a glass bottle and stored at room temperature under nitrogen (MW 6340).

B: Preparation of poly-(siloxane-urethane)

The triisocyanate prepolymer of Example 44A (21.81 g, 4.229 m mole) is weighed into a 50 ml round bottom flask. An equivalent amount of 1,3-bis(4-hydroxybutyl) tetramethyldisiloxane (1.76 g, 6.343 m mole) is added and mixed on a rotavapor for 20 minutes. The mixture is poured into a MYLAR lined glassmold and cured as described in example 12. A clear, colorless silicone rubber was obtained, useful for the production of soft contact-lenses.

Examples 45–48 describe the preparation of poly-(siloxane-urethane)-inter penetrating polymer networks (IPN's) with vinyl polymers.

EXAMPLE 45

The triisocyanate prepolymer of Example 6 (MW 6150, 16.36 g, 2.660 m mole) is formulated with an equivalent of 1,3-bis(4-hydroxybutyl) tetramethyldisiloxane (MW 278.6, 1.11 g, 3.990 m mole) in a 50 ml round bottom flask on a rotavapor. After 20 minutes of mixing, the polysiloxane-polyurethane formulation (4.86 g) is mixed with N,N-dimethylacrylamide (0.54 g, 10% by weight) into which VAZO 52* initiator (2.7 mg) had previously been dissolved. The mixture is thoroughly degassed and poured into a 0.5 mm thick MYLAR-lined mold, the surface of which had previously been coated with ethoxylated PVA as described in Example 13. The formulation is cured first for 10 hours at 40° C., during which time the polyurethane network forms, than at 80° C. for 3 hours. A clear polymer with a highly wettable surface and a water content, after hydration, of 14.3% (by weight) is obtained.

EXAMPLE 46

Using the procedure described in Example 45, the siloxane-urethane formulation (3.51 g) is mixed with methacryloxypropyltris(trimethylsiloxy)silane (0.39 g, 10% by weight) containing 2.0 mg of VAZO 52 and cured at 40° C. for 10 hours and 80° C. for three hours. A clear, colorless polymer with a highly wettable surface is obtained.

*VAZO 52 is 2,2'-azo bis (2,4-dimethylvalero nitrile).

EXAMPLE 47

The procedure of Example 45 is repeated using 4.10 g of the silicone-urethane formulation and 0.46 g of tridecylfluorohexyl-ethyl methacrylate, containing 2.28 mg VAZO 52. Curing at 40° C. for 10 hours and at 80° C. for 3 hours yields a clear, colorless polymer with a highly wettable surface.

EXAMPLE 48

The procedure of Example 45 is repeated using 5.00 g of the silicone-urethane formulation and 0.56 g (10%) of methyl methacrylate, containing 10 mg benzoin methyl ether. After curing the polyurethane at 80° C. for three hours, the mold is exposed to UV radiation from a SYLVANIA Black-Lite-Blue lamp for 5 hours. A clear, highly wettable polymer is obtained.

What is claimed is:

1. A compatible, interpenetrating-polymer-network composition which comprises
   (I) 95–50% by weight of the total composition of a siloxane-urethane polymer formed by the reaction of;
   (A) a di- or poly-hydroxyalkyl substituted alkyl polysiloxane having a number average molecular weight between about 200 and about 10,000 and
   (B) a substantially compatible, aliphatic, cycloaliphatic or aromatic di- or tri-isocyanate,
   wherein the total number of hydroxyl groups in component (A) is substantially stoichiometrically equivalent to the total number of isocyanate groups in component (B), and with the proviso that an effective crosslinking amount of (A) or (B) or both (A) and (B) is present and possesses a functionality greater than two, and
   (II) 5–50% by weight of the total composition of a vinyl polymer or copolymer obtained by the free-radical polymerization of a vinyl monomer or mixture of vinyl monomers:
   wherein said siloxane-urethane polymer (I) is formed by a polymerization which occurs prior to the polymerization reaction which forms said vinyl polymer (II).

2. A composition according to claim 1 wherein component (I) is 95–75% by weight and component (II) is 5–25% by weight of the total composition.

3. A composition according to claim 1 where in component (I) (A) is a di- or poly-hydroxy substituted polysiloxane of formula $A_1$, $A_2$ or $A_3$, with the structures:

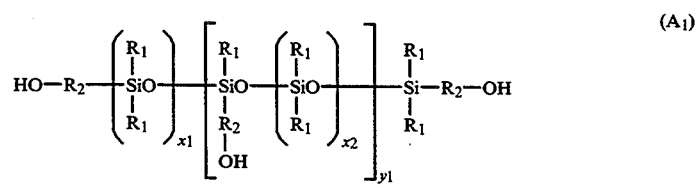

(A₁)

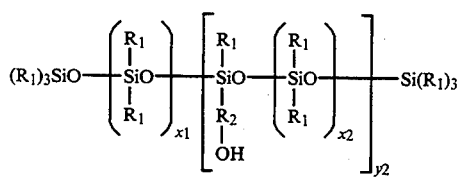 (A2)

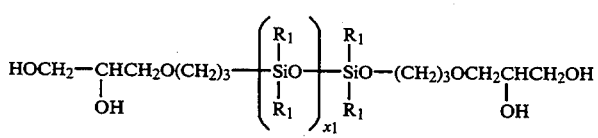 (A3)

wherein:

$R_1$ is an alkyl group of 1 to 4 carbon atoms or phenyl, $R_2$ is a linear or branched alkylene group with 2 to 6 carbon atoms a polyoxyalkylene group of structure:

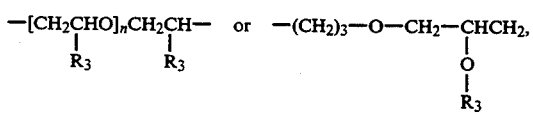

wherein $R_3$ is hydrogen or methyl and n is an integer from 1 to 50;

$x_1$, $x_2$ are integers from 1 to 500; $y_1$ is 0 to 4, $y_2$ is 2 to 5 with the proviso that the ratios of:

$$\frac{x_1 + x_2 y_1}{y_1 + 2} \text{ and } \frac{x_1 + x_2 y_2}{y_2}$$

are not greater than 70.

4. A composition according to claim 3 where in component (I)

(A) contains 40–60 hydroxyl equivalent percent of polysiloxane tetrols $A_3$, wherein $x_1$ is 10–50 and $R_1$ is methyl, and 40–60 hydroxyl equivalent percent $A_1$, where $y_1$ is zero, $x_1$ is 15–60, $R_1$ is methyl, $R_2$ is propylene, 1-methylpropylene, or

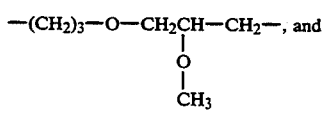

(B) is isophorone diisocyanate or 2,2,4(2,4,4)-trimethylhexane-1,6-diisocyanate.

5. A composition according to claim 3 where in component (I)

(A) is of structure $A_1$, where $y_1$ is zero, $x_1$ is 5–50, $R_1$ is methyl, $R_2$ is propylene, butylene, 1-methylpropylene or

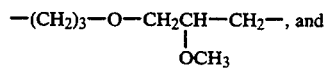

the diisocyanate (B) is isophorone diisocyanate or 2,2,4 (2,4,4) trimethylhexane-1,6-diisocyanate.

6. A composition according to claim 3 where in component (I)

(A) contains 40–60 hydroxyl equivalent percent of polysiloxane-tetrols of structure $A_3$, and diisocyanate (B) is isophorone diisocyanate or 2,4,4(2,4,4)-trimethylhexane-1,6-diisocyanate.

7. A composition according to claim 3 where in component (I)

(A) contains 40–60 hydroxyl equivalent percent of polysiloxane diols of structure $A_1$, where $y_1$ is zero or 1

$x_1$ is 1–5, $R_1$ is methyl, $R_2$ is propylene, or butylene, and the diisocyanate (B) is isophorone diisocyanate or 2,2,4(2,4,4) trimethylhexane-1,6-diisocyanate.

8. A composition according to claim 1 where in component (I)

(B) is isophorone diisocyanate, 2,2,4(2,4,4)-trimethylhexane-1,6-diisocyanate or 1,2- or 1,4- toluene diisocyanate.

9. A composition according to claim 1 where in component (II) the vinyl polymer is prepared from a fluoroalkyl acrylate or methacrylate with 3 to 21 F atoms in the fluoroalkyl group, from an oligosiloxanyl-silylalkyl acrylate or methacrylate with 2 to 10 Si atoms in the oligosiloxanyl group, from a hydroxyalkyl acrylate or methacrylate, N-vinylpyrrolidone, N,N-dimethylacrylamide or methyl methacrylate.

10. A composition according to claim 1 where in component (II) the vinyl polymer is prepared from N,N-dimethylacrylamide, methyl methacrylate, 2-hydroxyethyl methacrylate, methacryloxypropyl-tris (trimethylsiloxy)silane or tridecylfluorohexyl-ethyl methacrylate.

11. An ophthalmic device prepared from the composition according to claim 1.

12. An ophthalmic device according to claim 11 which is a contact lens.

13. A composition according to claim 1, wherein component (I) (B) is a diisocyanate, triisocyanate or mixture thereof selected from the group consisting of ethylene diisocyanate, 1,2-diisocyanatopropane, 1,3,-diisocyanatopropane, 1,6-diisocyanatohexane, 1,2-diisocyanatocyclohexane, 1,3-diisocyanatocyclohexane, 1,4-diisocyanatobenzene; bis(4-isocyanatocyclohexyl)methane, bis-4(isocyanatocyclohexenyl)methane, bis(4-1isocyanatophenyl)methane, 1,2- and 1,4-toluenediisocyanate; 3,3-dichloro-4,4'-diisocyanatobiphenyl; tris(4-isocyanatophenyl)methane,1,5-diisocyanatonaphthalene, hydrogenated toluene diisocyanate; 1,isocyanatomethyl-5-isocyanato-1,3-3-trimethylcyclohexane (=isophorone diisocyanate); 1,3,5-tris(6-isocyanatohexyl)biuret, 1,6-diisocyanato-2,2-4-(2,4,4)-trimethylhexane, 2,2′diisocyanatodiethyl fumarate; 1,5-diisocyanato 1-carboxypentane; 1,2-, 1,3-, 1,6-, 1,7-, 1,8-, 2,7- and 2,3-diisocyanatonaphthalene; 2,4- and 2,7-diisocyanato 1-methylnaphthalene; 1,4-diisocyanatomethylcyclo-hexane; 1,3-diisocyanato-6(7)-methylnaphthalene; 4,4'-diisocyanatobiphenyl; 4,4'-diisocyanato-3,3'-dimethoxybisphenyl; 3,3'- and 4,4'-diisocyanato-2,2'-dimethyl biphenyl; bis-(4-isocyanatophenyl)ethane and bis(4-isocyanatophenylether).

* * * * *